Jan. 2, 1951  A. E. ANDERSSON  2,536,526
MOVABLE IRON INSTRUMENT

Filed April 16, 1945  2 Sheets-Sheet 1

Inventor
A. E. Andersson
By Glascock Downing Seeby
Attys.

Jan. 2, 1951 A. E. ANDERSSON 2,536,526
MOVABLE IRON INSTRUMENT
Filed April 16, 1945 2 Sheets-Sheet 2
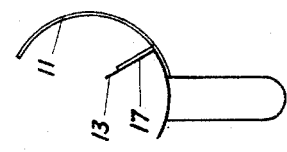
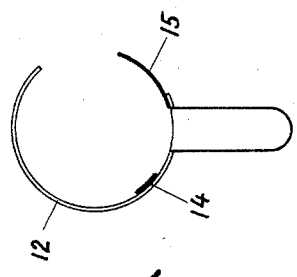
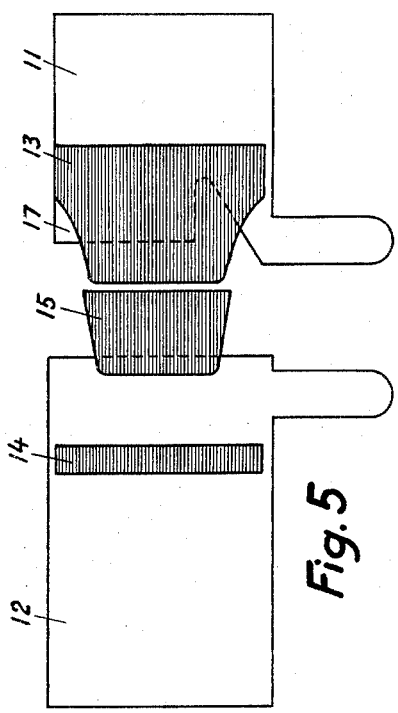
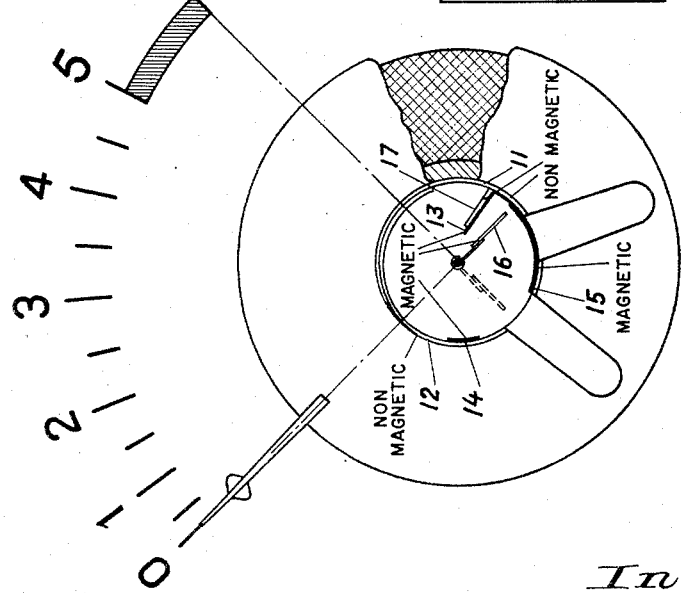
Inventor
A. E. Andersson
By Glascock Downing Seebold
Attys.

Patented Jan. 2, 1951

2,536,526

UNITED STATES PATENT OFFICE 2,536,526

MOVABLE IRON INSTRUMENT

Albert Emanuel Andersson, Flysta, Spanga, Sweden, assignor to Telefonaktiebolaget L M Ericsson, Stockholm, Sweden, a company of Sweden Application April 16, 1945, Serial No. 588,484
In Sweden May 13, 1944

2 Claims. (Cl. 171—95)

The invention relates to a movable iron instrument in which an iron core, carried by a rotatable shaft cooperates with a stationary iron core in such a manner that both repel each other upon excitation of a coil enclosing them. It is a very tedious work to adjust such an instrument after manufacturing, especially when previously marked scales are to be used. If for instance the spring of a certain instrument has too great a torque so that the deflection does not attain the desired value for a certain current through the coil, one has hitherto been compelled to detach the spring and reduce the torque in a suitable manner. It is of course possible to obtain an increased deflection by displacing e. g. the stationary iron in relation to the movable iron. Such a displacement however gives a proper deflection only for a certain current intensity (or a small current range) whereas proper deflections for the other values of the current intensity are not obtained. Thus it is not possible to obtain a scale distribution according to the marked scale as soon as an adjustment of the instrument, performed by means of a displacement of the stationary iron, is made. The scale distribution is in other words not invariable by adjustment but variable.

It is an object of the present invention to provide an instrument enabling an adjustment of the instrument without the scale distribution thereby being changed, should even rather great variations in spring torque or magnetization appear.

Figure 3:
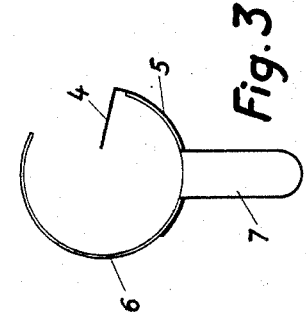
Figure 2:
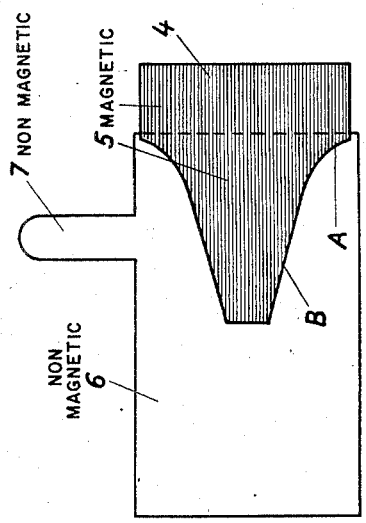
Figure 1:
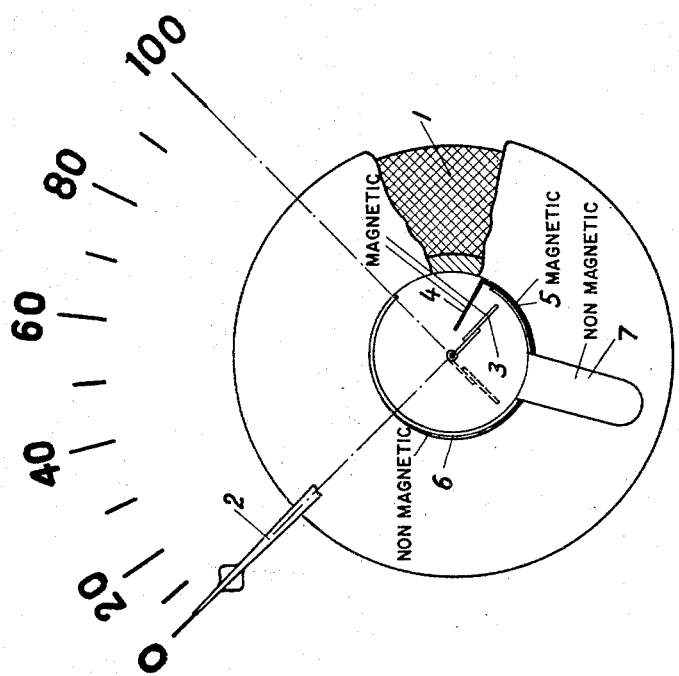

The invention will be described in detail with reference to the enclosed drawings showing two embodiments. Fig. 1 is a partial cross section through an instrument according to the invention and Fig. 2 shows the radial and the circumferential portions of the iron. Fig. 3 shows the stationary iron and a sleeve carrying it.

Fig. 4 shows in partial cross section a modification of the invention, by which the instrument is provided with an additional stationary repulsion iron and Fig. 5 shows in plan the stationary irons for said instrument. Figs. 6 and 7 show the two sleeves and the irons fixed thereon.

In Figs. 1 to 3, 1 is the coil winding, 2 the pointer of the instrument, 3 the movable, radially disposed iron mounted on the shaft carrying the pointer. The stationary iron consists of two parts 4 and 5 constituting a unit, part 4 of which being radially disposed and part 5 extending circumferentially along the inner cylindrical surface of the coil. The iron 4 is made together with iron 5 out of one piece of iron sheet, the iron part 4 thereby being bent at right angles to the iron 5. Fig. 2 shows the shape of the two irons, the breadth of iron 5 first sharply decreasing along a curved line A (Fig. 2) in the deflection direction, and thereafter more slowly decreasing along a straight line B. The irons 4 and 5 are carried by a cylindrical iron sleeve 6 of non-magnetizable material (Fig. 3) which by means of the strip 7 may be displaced to different positions in the hole of the coil. If now the spring of a certain instrument has too great a moment, a certain current does not give a deflection sufficient to move the pointer to the proper position on the scale and the iron 4—5 must be turned by means of the strip 7 in such a way that the iron 4 approaches the movable iron 3. The repulsing force between the irons 3 and 4 hereby increases during turning of irons 4—5 until the deflection caused by the current in question attains the desired value. The change in the scale-distribution, that would arise by a displacement of the radially disposed iron part 4 alone, and which is due to the repulsing force between irons 3 and 4 decreasing with the square of the distance between irons 3 and 4 will be avoided if the iron 5 is connected to the iron 4 and consequently displaced at the same time as the iron 4 is displaced (in clockwise direction in Fig. 1), so that the iron 5 after displacement of irons 4—5 for the same current intensity will occupy another position in relation to the iron 3, the latter thereby being influenced by the iron 5 with another force than before. By dimensioning and shaping of the iron 5 as above described it is now possible to attain that the sum of the forces, by means of which the iron 3 in each position of same is influenced by the radially disposed iron 4 and the circumferentially disposed iron 5, has such a magnitude that the scale distribution will be unchanged even after an adjustment of the instrument by means of displacement of the combined iron 4.5. If for instance the printed scale is linear there is proportionality between current increase (from an arbitrary value of the current force) and corresponding increase in the deflection and this proportionality is maintained also after an adjustment of the instrument through displacement of the irons 4.5. If instead the spring of the instrument should have too small a moment so that a certain current gives too great a deflection the two irons 4—5 are to be turned in counterclockwise direction (Fig. 1), the distance between the two irons 3 and 4 thereby being increased until the deflection decreases sufficiently to bring the pointer to the proper position on the scale. It is evident that the desired effect depends on the form of the iron 5 as well as on the thickness of the same, the proper shaping for a certain material thereby being achieved empirically. The form of the iron 5 shown in Fig. 2, wherein the outer edges are curved in the vicinity of the iron 4, has proved to be suitable for an iron thickness of about 0.3 mm.

It has proved to be possible to adjust an instrument according to the invention if the moment of the spring is up to 10% too strong or too weak, the instrument thereby showing right in each position of the scale with an accuracy of ±0.5% and the scale-distribution thus being mainly unchanged.

Figs. 4–6 show an embodiment showing the application of the invention to an instrument, the scale of which is provided with a crowded upscale portion. Two sleeves of non-magnetizable material 11 and 12 are here used. The sleeve 11 carries the above mentioned combined radial and circumferential iron 13, the radial part of the iron 13 thereby being fastened to a radially bent strip 17 of the sleeve 11. By turning the iron 11 it is possible to adjust the instrument in the same manner as shown in the above mentioned embodiment. The sleeve 12 carries an iron strip 14 exerting a repulsing action on the movable, radially disposed iron 16 when the latter approaches its end position, the last portion of the scale thereby being strongly crowded. To prevent this crowded portion from extending over a long portion of the scale the sleeve 12 also carries a trapezoidal additional iron 15, the device being shaped in such a way that the iron 15 and the circumferential part of the iron 13 over-lap each other more or less according to the position of the sleeves 11 and 12 (as is shown in Figs. 4 and 6–7).

The invention is not limited to the embodiments described but can be modified in several ways.

I claim:

1. A movable iron instrument comprising a scale, an iron core part carried by a rotatable shaft and arranged to cooperate with a stationary iron core, and a current-conducting solenoid enclosing said iron core part and said stationary iron core, said stationary iron core comprising a radially disposed portion and a circumferentially disposed portion, the latter portion extending along the inner surface of said solenoid and having its breadth tapered in the direction of increasing rotation of said shaft, said portions being combined to form a unit, means for angularly adjusting said unit in said solenoid, a separate trapezoidal iron part within said solenoid, means for angularly adjusting said trapezoidal iron part, and an iron repulsion strip circumferentially spaced from said trapezoidal iron part in the direction of increasing rotation of said shaft to produce a crowding of the scale with increasing rotation of said shaft, said trapezoidal iron and the circumferential portion of said stationary iron core overlapping one another more or less according to the adjustments of said angular adjusting means.

2. A movable iron instrument in accordance with claim 1, in which each of said angularly adjusting means comprises a cylindrical member of non-magnetizable sheet material rotataby mounted within the opening of said solenoid, the stationary iron core being secured to one of said members and the trapezoidal iron part being secured to the other of said members.

ALBERT EMANUEL ANDERSSON.

REFERENCES CITED

The following references are of record in the file of this patent:

UNITED STATES PATENTS

| Number | Name | Date |
|---|---|---|
| 1,501,189 | Record | July 15, 1924 |
| 1,560,459 | Worrall | Nov. 3, 1925 |
| 1,600,332 | Haslauer | Sept. 21, 1926 |
| 1,632,623 | Rich | June 14, 1927 |
| 2,183,685 | Lingg | Dec. , 1939 |
| 2,260,026 | Hoare | Oct. 21, 1941 |

FOREIGN PATENTS

| Number | Country | Date |
|---|---|---|
| 288,665 | France | May 18, 1899 |
| 2,299 | Great Britain | Dec. 14, 1899 |